United States Patent

Furlani et al.

[11] Patent Number: 5,544,132
[45] Date of Patent: Aug. 6, 1996

[54] APPARATUS FOR SELECTIVELY INVERTING A MAGNETIC BIASED FIELD FOR MAGNETO-OPTIC RECORDING

[75] Inventors: Edward P. Furlani, Lancaster; J. Kelly Lee, Rochester, both of N.Y.

[73] Assignee: Eastman Kodak Company, Rochester, N.Y.

[21] Appl. No.: 403,030

[22] Filed: Mar. 13, 1995

[51] Int. Cl.$^6$ ..................................................... G11B 13/04
[52] U.S. Cl. ............................... 369/13; 360/114; 360/59
[58] Field of Search .................. 369/13, 126; 360/114, 360/59, 60, 66; 365/122

[56] References Cited

U.S. PATENT DOCUMENTS

| | | | |
|---|---|---|---|
| 4,962,492 | 10/1990 | Mathildus | 369/13 |
| 5,020,042 | 5/1991 | Fearnside et al. | 369/13 |
| 5,291,345 | 3/1994 | Umeda et al. | 360/59 |
| 5,317,548 | 5/1994 | Matsuda et al. | 369/13 |
| 5,351,221 | 9/1994 | Ohno | 369/13 |

*Primary Examiner*—Ali Neyzari
*Attorney, Agent, or Firm*—Peyton C. Watkins

[57] ABSTRACT

An apparatus for selectively inverting an external magnetic field in a magneto-optic recording system so that information can be selectively recorded on or erased from a magneto-optic recording element of the system moving through said field, the apparatus comprises a permanent magnet having its north and south poles oriented along its cross-sectional dimension. A core having a shape which is adaptable to selectively impart a predetermined magnetic field to the permanent magnet for rotating the permanent magnet, which directs a flux generated by the predetermined magnetic field for reducing electro-magnetic interference, and which defines a preferential orientation of the magnet for selectively maintaining the magnet in the preferential orientation.

6 Claims, 1 Drawing Sheet

APPARATUS FOR SELECTIVELY INVERTING A MAGNETIC BIASED FIELD FOR MAGNETO-OPTIC RECORDING

FIELD OF THE INVENTION

The invention relates generally to the field of magneto-optic recording.

BACKGROUND OF THE RELATED ART

In the magneto-optic recording process, a vertically magnetizable recording layer is initially sensitized by simultaneously subjecting it to a uniform magnetic field and a temperature which exceeds its Curie temperature (e.g., 400 degrees C.). The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam.

During the recording process, a laser beam intensity is switched between high and low levels, representing the digital (binary) information being recorded. Only the high level is sufficiently intense to raise the temperature of the irradiated portion of the recording layer to above its Curie temperature; thus, digital information is recorded at the point of incidence of the laser as the more intensely irradiated magnetic domains flip in orientation to align themselves with the reverse magnetic bias field. Playback of the recorded information is commonly achieved by scanning the information tracks with a plane-polarized beam of radiation and monitoring the reflected beam for shifts in the plane of polarization, as produced by the well known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction.

Various schemes have been proposed to achieve the magnetic field inversions required in switching between the record and erase modes of the magneto-optic recording process. In the disclosures of U.S. Pat. Nos. 5,020,042 and 5,291,345, for example, the field inversion apparatus consists of a magnetic field producing coil surrounding the magnet. When the coil is energized, the field that it creates imparts a torque to the magnet forcing it to rotate.

Although the presently known and utilized apparatus and method for rotating the magnet are satisfactorily, they are not without drawbacks. First, the magnetic coupling between the magnet and the coil is inefficient and requires substantial power. Secondly, the magnet field from the coil permeates the surrounding region and can give rise to undesired electromagnetic interference with neighboring electrical components thereby degrading their performance.

Consequently, a need exists for an apparatus for selectively inverting an external magnetic field in a magneto-optic recording system so that electromagnetic interference is eliminated and less power is consumed.

SUMMARY OF THE INVENTION

It is an object of the present invention to provide an apparatus for selectively inverting a magnetic bias field in a magneto-optical recording system that eliminates or reduces the above stated drawbacks.

It is an advantage of the present invention to provide an apparatus for selectively inverting an external magnetic field in a magneto-optic recording system, which apparatus is compact and efficient to produce.

It is a feature of the present invention to provide a core which is adaptable to selectively impart a predetermined magnetic field to the permanent magnet for rotating the permanent magnet.

With this and other objects in view, the present invention resides in an apparatus for selectively inverting an external magnetic field in a magneto-optic recording system so that information can be selectively recorded on or erased from a magneto-optic recording element of said system moving through said field, the apparatus comprising: (a) a permanent magnet having its north and south poles oriented along its cross-sectional dimension; and (b) a core having a shape which is adaptable to selectively impart a predetermined magnetic field to said permanent magnet for rotating said permanent magnet, which directs a flux generated by the predetermined magnetic field, and which defines a preferential orientation of said for selectively maintaining said magnet in the preferential orientation.

BRIEF DESCRIPTION OF THE DRAWINGS

In the course of the following detailed description, reference will be made to the attached drawings in which.

DETAILED DESCRIPTION OF THE PREFERRED EMBODIMENTS

Figure 1:
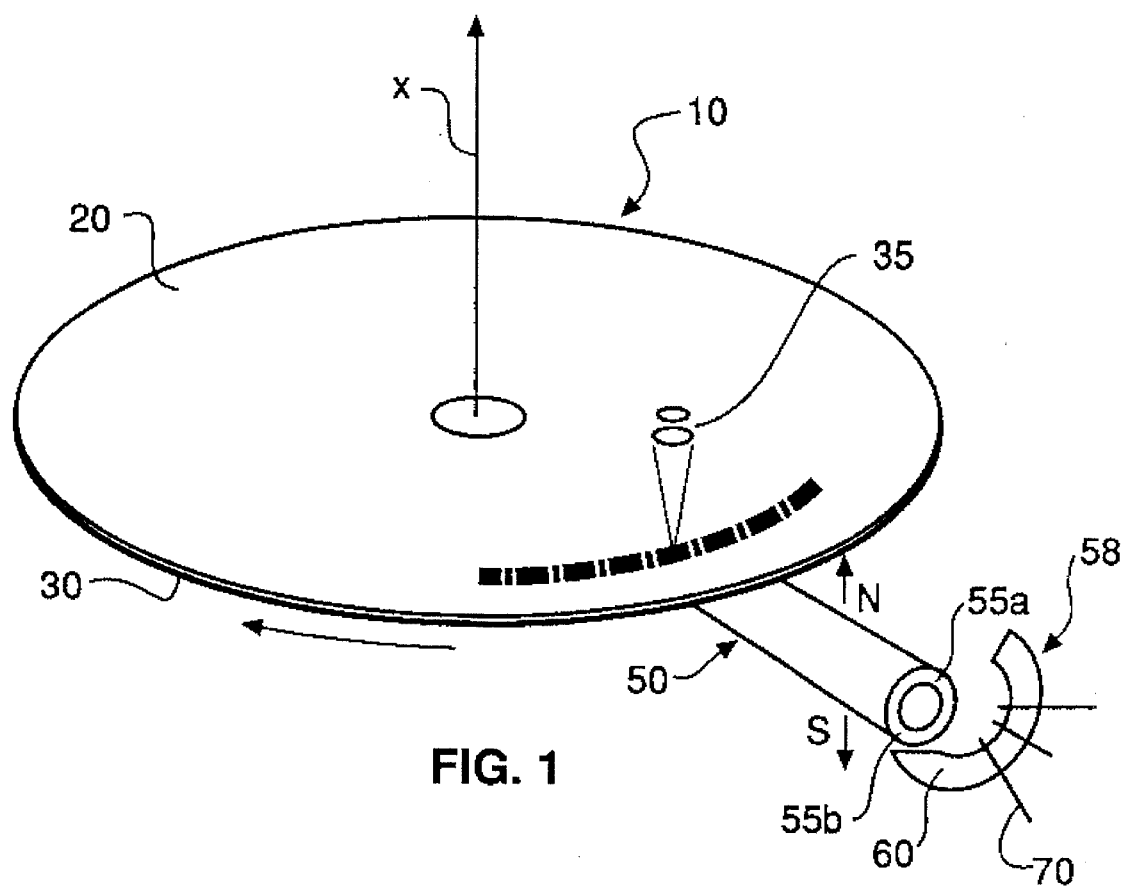
FIG. 1 a perspective view of the present invention.

Referring to FIG. 1, there is illustrated a magneto-optic recording element as shown in the form of a disk 10 which is adapted to be rotated about its central axis x. The essential features of the recording element are a vertically magnetizable recording layer 20 and a supporting substrate 30. During the recording step, the recording layer 20 is selectively heated by a beam of radiation, as provided by a laser source 35. The beam intensity is modulated by an information source (not shown) representing certain digital information which is to be recorded. The information source functions to switch the beam intensity of the laser source 35 between high and low levels, only the high level being sufficient to heat the recording layer 20 to at least its Curie temperature. An elongated permanent magnet 50, which includes two poles 55a and 55b (north and south), is radially disposed with respect to the rotating disk 10, and serves to produce a magnetic field. Magnet 50 is mounted for rotation about its longitude axis so that the direction of the field may be switched from the upward direction indicated in FIG. 1 to a downward direction in which the magnet 50 is rotated 180 degrees. A rotating mechanism (not shown), which is well known in the art, is operatively connected to the magnet 50 for permitting to rotate. The magnet 50 will cause magnetic domains in the recording element to flip orientations, from upward to downward, whenever the laser beam intensity is at its high level. In this manner, the digital information provided by the laser source 35 is magnetically recorded in the recording layer 20.

To erase the previously recorded information in the recording layer 20, the direction of the magnetic bias field is inverted, or in other words, the magnet 50 is rotated 180 degrees. After such field inversion, the laser source 35 scans the recording element while its intensity is maintained at its high level. While so radiated, all of the magnetic domains align themselves with the bias field thereby providing a uniformly sensitized disk or track which is again ready to record information.

As will be described in detail below, for moving the magnet 50, an actuator 58, which is positioned adjacent the magnet 50, includes a generally arcuate shaped core 60 positioned adjacent the magnet 50 and a coil 70 wrapped around the midsection of the core 60 for inducing a magnetic field in the core 60.

Figures 2, 3:
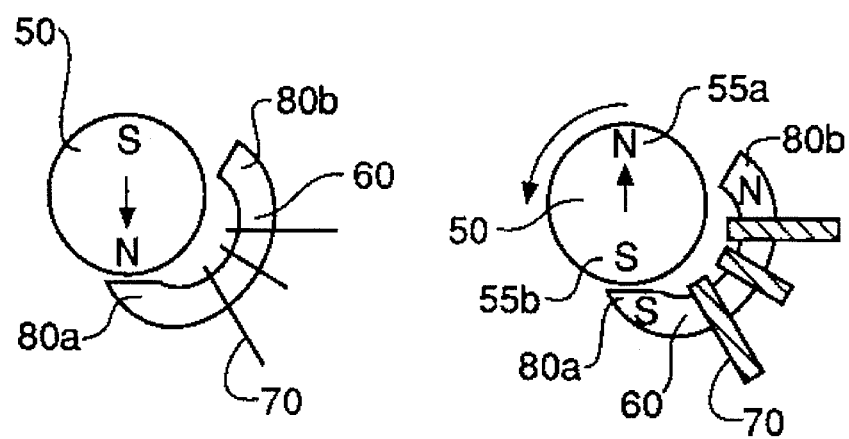
FIG. 2 is a cross sectional view of a permanent magnet and its associated actuator of the present invention.
FIG. 3 is a cross sectional view of the permanent magnet and its associated actuator illustrating the rotation of the permanent magnet.

Referring to FIG. 2, the core 60 includes two pole tips 80*a* and 80*b*. Pole tip 80*a* is positioned directly beneath the magnet 50 while the other pole tip 80*b* is positioned slightly upwardly from pole tip 80*a* and offset from the magnet 50 so that its distance from the magnet 50 is slightly longer than the other pole tip 80*a*.

Referring to FIG. 3, the operation of the actuator 58 is illustrated. Prior to energizing the coil 70, the magnet 50 is at rest with one of its poles 55*b* directly above the pole tip 80*a*. The pole 55*b* is magnetically attracted to pole tip 80*a* for maintaining the positional relationship of the poles 55*a* and 55*b* in relation to the disk 10. To rotate the magnet, the coil 70 is energized so that its pole tip 80*a* beneath the magnet 50 becomes the same polarity as the polarity of the magnet pole 55*b* above it. Thus, the pole tip 80*a* repulses the pole 55*b* while the other pole tip 80*b* attracts pole 55*b*, thereby inducing a counterclockwise rotation, as illustrated by the arrows. The coil 70 is only energized for a period of time that is long enough time to impart the torque necessary to rotate the magnet 50 180 degrees (counterclockwise). As the top pole 55*a* of the magnet 50 rotates counterclockwise towards the pole tip 80*a* of actuator core 60, it is attracted to it and comes to rest directly above it. With the coil 70 de-energized, the positional relationship of the magnet 50 in regard to the disk 10 is maintained as described above. The above described sequence is repeated each time a rotation is needed. It is instructive to note that when the coil 70 is energized, it induces a flux, and in turn the polarities generated on the pole tips 80*a* and 80*b*, through the core 60 according to the direction of the current flowing through the coil 70. For example, with the current flowing in one direction, the generated flux flows from one pole tip 80*a* to its other pole tip 80*b* and travels generally arcuately through the magnet 50 and the space immediately surrounding it so that the flux is contained within a restricted area for reducing electro-magnetic interference with other components.

It is thought that the present invention and many of its attendant advantages will be understood from the foregoing description and it will be apparent that various changes may be made in the form, construction and arrangement without departing from the spirit and scope of the invention or sacrificing all or any of its material advantages, the form hereinbefore described being merely a preferred or exemplary embodiment.

PARTS LIST

10 disk
20 recording layer
30 substrate
35 laser source
50 magnet
55*a* pole
55*b* pole
58 actuator
60 actuator core
70 coil
80*a* pole tip
80*b* pole tip

What is claimed is:

1. An apparatus for selectively inverting an external magnetic field in a magneto-optic recording system so that information can be selectively recorded on or erased from a magneto-optic recording element of said system moving through said field, the apparatus comprising:

(a) a permanent magnet having its north and south poles oriented along its cross-sectional dimension;

(b) a substantially U-shaped core having two ends in which one end is a proximal end disposed adjacent either the north or south pole, and the other end is a distal end radially disposed further away from said magnet than the proximal end for restricting induced flux to said core substantially to said core so that electro-magnetic interference is reduced; and (c) a coil wrapped around said core which, when energized, causes the proximal end to impart a magnetic polarity opposite of the polarity of the pole of the magnet to which it is adjacent for selectively rotating said magnet, and which coil, when de-energized, causes the proximal end to attract said magnet for maintaining their positional relationship.

2. The apparatus as in claim 1, wherein the distal end is disposed substantially ninety degrees from the proximal end.

3. The apparatus as in claim 2, wherein said magnet includes a cylindrical shape.

4. The apparatus as in claim 3, wherein said coil is disposed circumferentially around a portion of said magnet.

5. The apparatus as in claim 4, wherein said coil is wrapped around a midsection of said core.

6. The apparatus as in claim 4, wherein said core causes said magnet to rotate approximately 180 degrees for inverting the magnetic field.

\* \* \* \* \*